United States Patent [19]

Matsumoto

[11] Patent Number: 4,888,605
[45] Date of Patent: Dec. 19, 1989

[54] PHOTOGRAPHING APPARATUS WITH SELF-MONITORING DEVICE

[75] Inventor: Hajime Matsumoto, Hirakata, Japan

[73] Assignee: Daicolo Co., Ltd., Tokyo, Japan

[21] Appl. No.: 161,882

[22] Filed: Feb. 29, 1988

[30] Foreign Application Priority Data

Mar. 4, 1987 [JP] Japan ................................. 62-049494
Mar. 4, 1987 [JP] Japan ................................. 62-049495
Mar. 4, 1987 [JP] Japan ................................. 62-049496

[51] Int. Cl.$^4$ .................. G03B 1/60; G03B 13/00; G03B 17/26; G03B 29/00
[52] U.S. Cl. .................................... 354/75; 354/217; 354/219; 354/275
[58] Field of Search ................ 354/75, 219, 217, 275, 354/21

[56] References Cited

U.S. PATENT DOCUMENTS

| | | | |
|---|---|---|---|
| 3,898,681 | 8/1975 | Hertel | 354/275 X |
| 4,268,143 | 5/1981 | Dearing et al. | 354/275 X |
| 4,560,261 | 12/1985 | Ueda et al. | 354/121 |
| 4,763,146 | 8/1988 | Niikura | 354/75 |
| 4,769,699 | 9/1988 | Gebauer et al. | 354/75 X |

Primary Examiner—Michael L. Gellner
Attorney, Agent, or Firm—Edwin E. Greigg

[57] ABSTRACT

A photographing apparatus with a self-monitoring device having a still camera and a video camera sharing a photographic lens each other, a monitoring television device for forming a monitored image thereon from video signals obtained by the video camera, a housing member for accommodating therein the still camera, video camera and the monitoring television device and a device for freezing the video signals from the monitoring television device in connection with a shutter release operation.

13 Claims, 15 Drawing Sheets

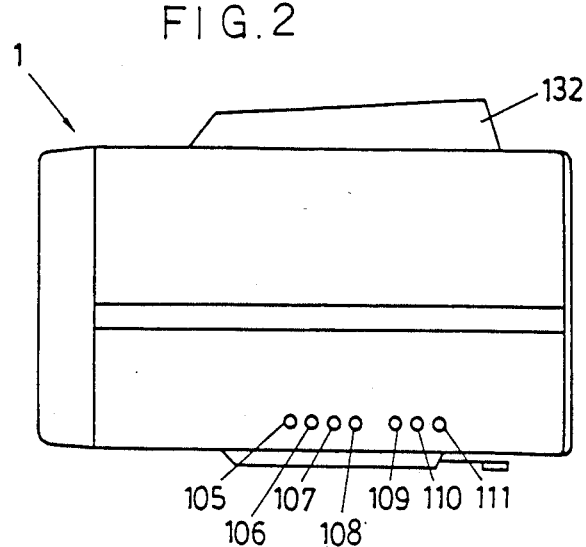
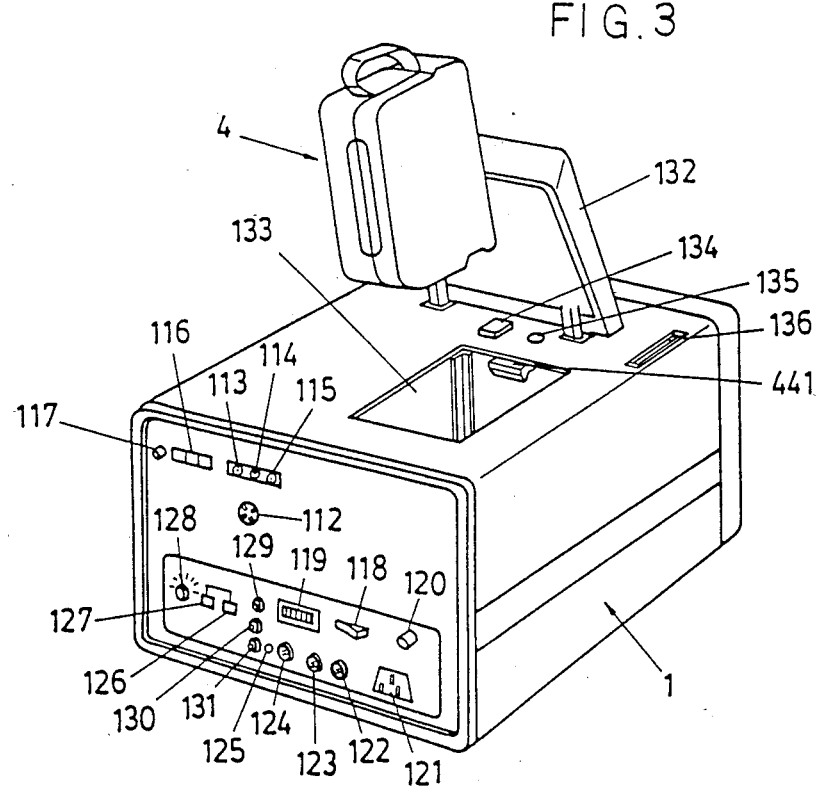

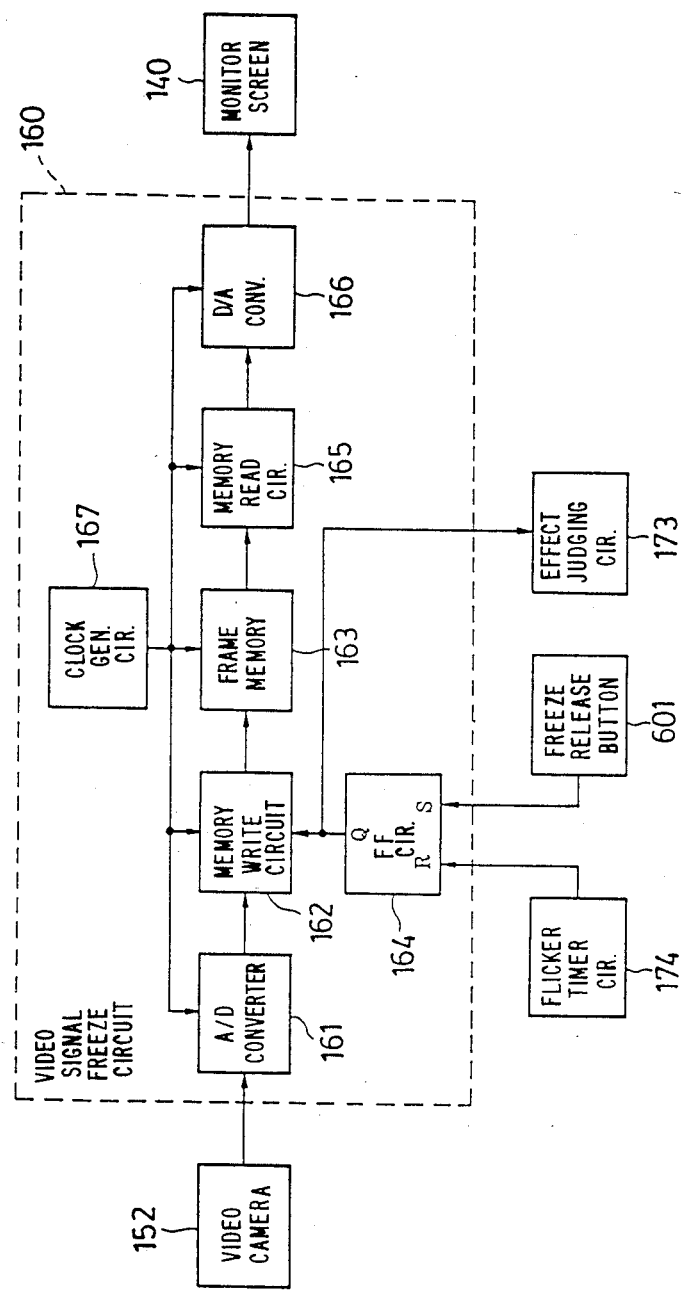

PHOTOGRAPHING APPARATUS WITH SELF-MONITORING DEVICE

BACKGROUND OF THE INVENTION (1) Field Of The Invention

The present invention relates to a photographing apparatus with a self-monitoring television device, and more particularly to a photographing apparatus of the above-noted type comprising a still camera and a video camera sharing a same photographic lens unit each other and a monitoring television device for forming an image from video signals generated from the video camera, with the still camera, the video camera and the monitoring television device all being accommodated inside a housing.

(2) Description Of The Prior Art

There is disclosed a photographing apparatus with a self-monitoring device for example in U.S. Pat. No. 4,560,261, which apparatus is for use in succesively photographing a great number of people one by one for obtaining their portrait photographs to be used in a school-graduation memorial photo album or to be attached to a name card or an ID card. This apparatus includes at a front face of its body a concave mirror acting as a monitoring screen, whereby a user (photographic object) may take a photography of his own by using a long-wired shutter release button while monitoring his self image on the screen.

However, this apparatus has drawbacks to be described next. That is, it is impossible for this apparatus to avoid occurence of differences between the image on the concave mirror and the actually photographed image, i.e. the occurence of parallax, which need be corrected. For this reason, there is provided an arrangement so that the convex mirror is adapted to be movable and the same is preliminarily adjusted towards the position of the photographic object. In spite of such arrangement, there is still the necessity of a troublesome operation for readjusting the direction of the concave mirror in order to correct the above-noted parallex each time the position of the photographic object is changed.

In addition, in the case of the convex mirror, it is inherently impossible to avoid image distortions whatever small curvature ratio is provided to the mirror face. That is to say, it is impossible for the concave mirror to accurately monitor the actual image of the object and there is always a difference between the actual image and the photographed image. In other words, the concave mirror when used for monitoring only serves for making it possible for the user (photographic object) to make sure of approximate photographable range.

Moreover, since this apparatus is not of the single lens reflex type, it is difficult to exchange lenses, which adds to the above inconvenience.

With view to the above-described prior-art problems, the present applicant developed and provided a photographing apparatus capable of solving the above problems, which invention is disclosed in a Japanese patent application published under SHOWA 61-177872.

Referring more particularly to this apparatus with reference to FIG. 20, this photographing apparatus comprises a still camera and a video camera (not shown) sharing a photographic lens 7 and a monitoring television device 8 for transducing into a photographic image video signals of photographic information obtained by the above video camera, with the still camera, video camera and the monitoring television device 8 all being accommodated inside a housing 6.

The still camera and the video camera are constructed such that their photographic optical paths may be changed over by a movable mirror provided rearwardly of the photographic lens 7 or the optical paths may be used as they are by providing a half-mirror.

Optical beam reflected by the movable mirror or passing the half-mirror, further passes a reducing lens to be formed as an image on a photographing face of a solid-state photographic element and then monitored in a laterally reversed form thereof on the monitoring screen 8 provided adjacent the photographic lens 7. In case there is provided the movable mirror, this mirror is retracted from the photographic optical path in the course of a photographing operation and the image is imprinted on a film face togetherwith identification data.

However, in the case of the above-described photographing apparatus, there is limit for the size of the monitoring screen. And also, since the photographic object is typically distant by 2 m from the apparatus, although the user (photographic object) may roughly observe his position, size and facial expressions on the monitored image, close and fine observation is impossible.

As the result, there is always possibility that the photography developed later turns out to be unsatisfactory in spite of the monitoring.

In view of the above-described state of the art, It is the object of the present invention to provide an improved photographing apparatus with a self-monitoring television device capable of solving the above drawbacks of the prior art apparatuses.

SUMMARY OF THE INVENTION

In order to accomplish the above object, a photographing apparatus with a self-monitoring television device related to the present invention comprises video signal freezing means for freezing (fixing) video signals from a video camera in operative connection with a shutter release operation.

Referring to operations of the apparatus having the above feature, when a user (photographic object) releases the shutter release button by means of the remote control means after selecting a suitable shutter chance while self-monitoring his own pose or facial expressions on the monitoring screen, first, the video signals of the video camera are frozen and the monitored image becomes still, and then a photograph is taken with the shutter release operation.

According to the above arrangement, the frozen image immediately before the photography operation remains on the screen after the shutter release operation. Accordingly, if the user approaches the monitoring screen and closely examines his self image thereon at the moment of the shutter release operation and finds it unsatisfactory, he can take another photography on the spot. As the result, there is no possibility that the user finds the photography unsatisfactory only after the development of the same.

As described above, since the user may take as many photographs as he likes until he is satisfied, unlike the conventional apparatuses with which the user may know the result only after the development and printing of the film, in the case of the apparatus of the present invention, there is no possibility of photography of the object with his eyes being closed or directed in an unexpected direction or with unsatisfactory facial expressions, whereby a photography of a desired image may be obtained reliably.

BRIEF DESCRIPTION OF THE DRAWINGS

Accompanying drawings illustrate a preferred embodiment of a photographing apparatus with a self-monitoring television device related to the present invention, in which;

FIG. 2 is a right side view of a body of the apparatus shown in FIG. 1, FIG. 3 is a perspective view showing the body of FIG. 2 with its top cover being opened togetherwith a film magazine, FIG. 18 is a block diagram showing an example of a video signal freezing circuit.

DESCRIPTION OF THE PREFERRED EMBODIMENTS

Preferred embodiments of the present invention will be particularly described hereinafter with reference to the accompanying drawings. FIG. 1 through FIG. 19.

Figure 1:
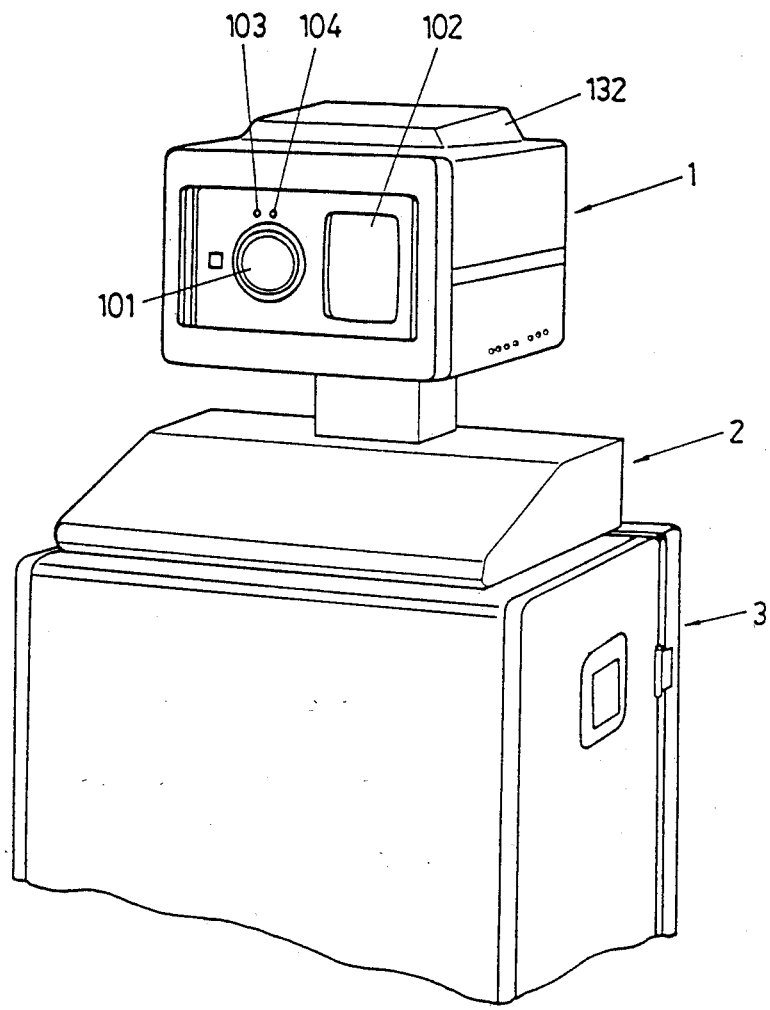
FIG. 1 is a perspective view showing an outer configuration of the photographing apparatus with a self-monitoring television device according to one preferred embodiment of the present invention.

FIG. 1 is a perspective view showing an outer configuration of a photographing apparatus with a self-monitoring device according to one preferred embodiment of the present invention.

This photographing apparatus includes a body 1, a base 2 for tiltably supporting the body 1 and a carrying case 3 accommodating the body 1 and the base 2 and capable of mounting the base 2 thereon at a time of a photographing operation.

This carrying case 3, though will be more particularly described later, is capable of accommodating also an electronic flash device for illuminating an object to be photographed at a time of a photographing operation, a power supplying device for the same and a pole for supporting the flash device. At the time of a photographing operation, the carrying case 3 acts also for supporting the pole and the case 3 is movable on the floor face by means of casters attached to its lower face.

At a front face of the body 1, there are provided a photographic lens 101 constituted by a zooming lens having a focal length variable between 70 and 105 mm and an aperture diameter ratio of 2.8 and a monitoring screen 102 (a Brown tube face) of a monitoring device to be described later, with the lens 101 and the screen 102 being disposed towards the same direction and adjacent each other.

Upwardly of the photographic lens 101, there are provided a charging completion lamp 103 and an eye-guiding lamp 104. In operation, the charging completion lamp 103 has e.g. a green color and indicates by its green-colored illumination that the apparatus is ready for a photographing operation with a completion of charging of the electronic flash device. The eye-guiding lamp 104 has e.g. a red color and functions to guide the eyes of the user (the photographic object) from the monitoring screen 102 towards the photographic lens 101 by flashing for a short time period immediately after the user depresses a shutter release button of a remote controlling unit.

As shown in FIG. 2, at a right face of the body 1, there are formed adjusting holes 105 through 111 for adjustably varying hue, brightness, horizontal synchronization, vertical synchronization and white balance of the monitoring television device.

As shown in FIG. 3, at an upper portion of a rear face of the body 1, there are provided a warning buzzer 112 for generating a warning sound indicating that the remaining amount of the film has reached a predetermined value, a warning lamp 113 for issuing a visual warning indicating an incomplete loading of a film magazine 4 accommodating a wound-up film therein, a warning lamp 114 for issuing a visual warning indicating that a value on a subtraction type film magazine counter has reached a predetermined value, a warning lamp 115 for issuing a visual warning indicating that the remaining amount of the film has reached the predetermined value, a photo counter 116 for counting the number of shutter operations and displaying the same by means of a three-decimal-places seven-segment LED and a reset button 117 for resetting the photo counter 116 to a value of '0'.

At a lower half portion of the rear face, there are provided, a power switch 118, an unresettable sum-total counter 119 for unresettably counting a total number of shutter operations, a fuse 120, an AC power connector 121, a swing connector 122 for transmitting a tilting signal from the remote controlling unit, an eight-pin remote connector 123 for transmitting signals concerning a focus adjustment, zooming, still-OFF for returning a still image on the monitoring screen to a motion image, a six-pin remote connector 124 for transmitting tilting, zooming and release signals from another remote controlling unit, a synchronizing connector 125 for transmitting the release signal and a flash signal to the electronic flash device, a flash button 126 for causing the electronic flash device to effect a trial flashing operation, a manual button 126 for switching over between a test photographing mode and an actual photographing mode, an aperture setting knob 128 for setting an aperture of the photographic lens 101, a video input terminal 129, a video monitor terminal 130 and a freeze signal terminal 131.

Further, at an upper portion of the body 1, there are disposed an openable top cover 132, a film-magazine insertion hole 133 provided inside the top cover 132, a hook release button 134 for releasing a hook 441 (to be described particularly later with reference to FIGS. 9 and 10) for fixing the film magazine 4 inserted into the film-magazine insertion hole 133, a forcible release hole 135 for forcibly releasing the hook 441 at a time of e.g. a power failure by inserting thereinto a ball-point pen or the like and an information card insertion opening 136 for inserting thereinto an information card for identifying the photographic object.

Figure 4:
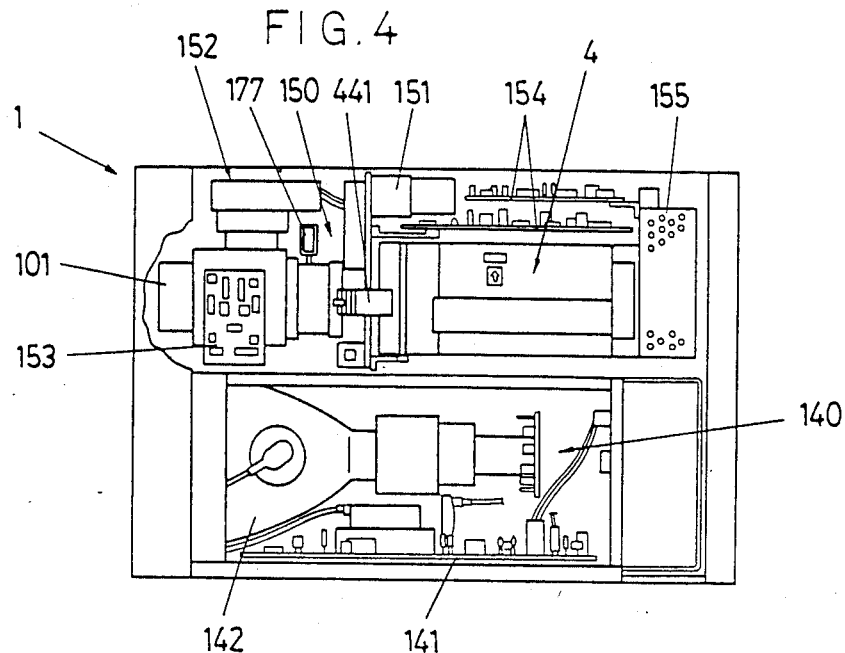
FIG. 4 is a plane view schematically showing an inner construction of the device with its cover of the body in FIG. 2 being removed.

Nextly, an inner construction of the body 1 of the apparatus with its cover being opened will be particularly described with reference to a schematic plane view of the same in FIG. 4. On one side of the portions divided into two in the width direction in the same figure, there is disposed a color monitoring television device 140 including a video signal processing circuit board 141 and a CRT 142. On the other side in the figure, there are disposed a still camera 150 having a photographic lens 101, a windingup motor 151, a video camera 152, a video camera driving circuit board 153, an overall control circuit board 154 and a power supply section 155. The still camera 150 is detachably loaded with the film magazine 4 accommodating a long-length film. Further, in this FIG. 4, a reference numeral 177 denotes a shutter solenoid.

To the rear of the photographic lens 101, there is fixedly attached a half-mirror with forming an angle of 45 degrees relative to an optical axis. The optical beam passing this half-mirror is guided via a lens shutter of the still camera 150 to a film face, and the optical beam reflected by the half-mirror is guided via a reducing lens of the video camera 152 to a solid-state photographic element using a CCD.

Figure 5:
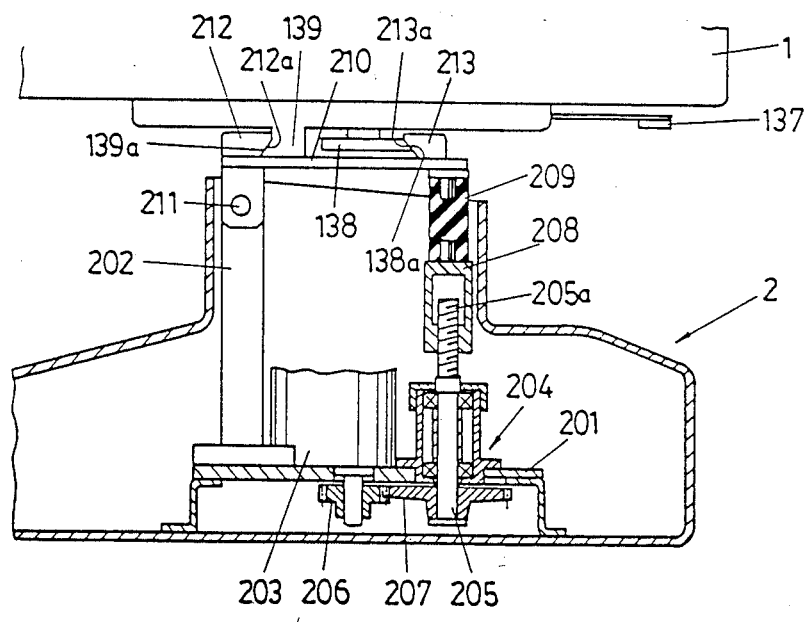
FIG. 5 is a sectional view showing a connecting portion between an inner construction of a base and the body.

The connecting portion between the inner construction of the base 2 and the body 1 will be described next with reference to FIG. 5 showing its sectional construction.

To a base plate 201 inside the base 2, there are fixedly attached a support 202, a motor 203 having a speed-reducing mechanism and a bearing 204. The bearing 204 rotatably supports a feed screw 205 having a screw portion 205a.

A rotational shaft, which speed is reduced, of the motor 203 integrally carries a pinion 206, which is in engagement with a gear 207 fixed to an end of the feed screw 205.

A driven screw 208 is in rotatable screwed engagement with a gear portion 205a of the feed screw 205, the driven screw 208 being connected via a flexible joint formed e.g. of rubber to a rear end of the base plate 210.

A forward end of this base plate 210 is pivotably attached via a support shaft 211 to an upper end of the support 202, and longitudinally on the upper face of the plate 210 there are fixed fixing claws 212 and 213 respectively forming tapered faces 212a and 213a. By mounting the body 1 onto the base plate 210 and then rotating a handle 137 of the body in a predetermined direction, an eccentric top 138 rotatably attached to a bottom face of the body is rotated togetherwith, a tapered face 138a defined on an outer peripheral portion of the top is depressed by a tapered face 213a of the fixing claw 213 of the base plate and a tapered face 139a of the fixing claw 139 of the body is depressed by the tapered face 212a of the fixing claw 212 of the base plate, whereby the body 1 is securely fixed to the base plate 210.

Figure 6:
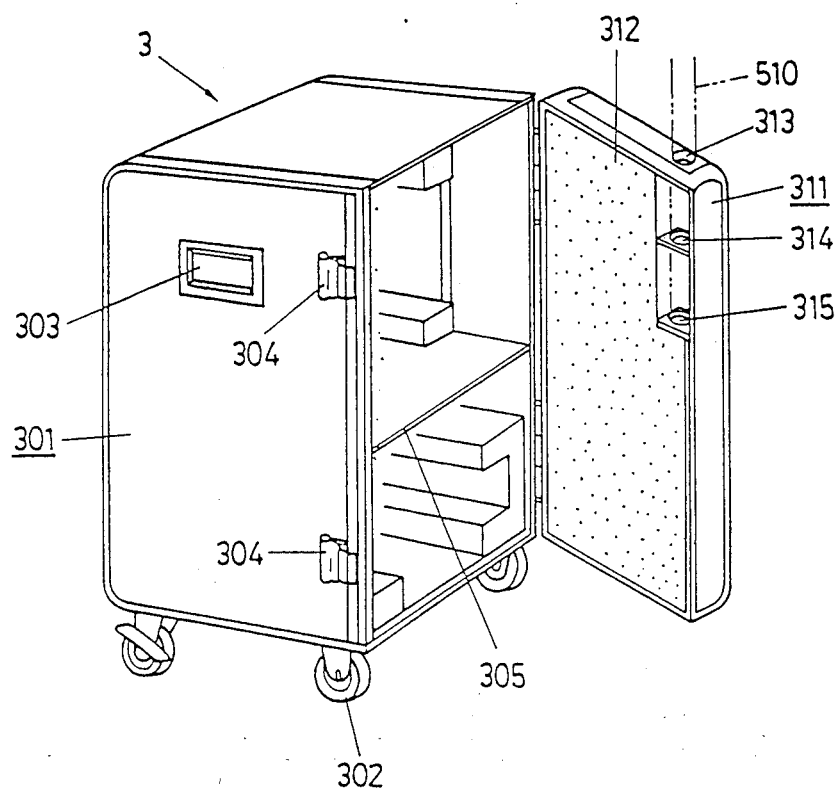
FIG. 6 is a perspective view showing an outer configuration of a carrying case with its door being opened.

The carrying case 3, as shown in FIG. 6, includes a housing member 301, a lid member 311 screwedly attached to the housing member 301, with the housing member 301 includes at a bottom face thereof four omnidirectionally movable casters 302 and at a side face thereof a handle 303 and a fixing metal member 304 for the lid member 311.

Inside of the housing member 301 is sectioned into upper and lower shelves, with the upper shelf accommodating the body 1 placed laterally and also an attachment box accommodating the film magazine 4, cords and films with an insulator member 312 being disposed towards the body 1 and with the lower shelf accommodating the base 2.

To an inner face of the lid member 311 of the carrying case, there is affixed the insulator member 312 formed of e.g. a foamed resin and at an end portion of the member 311 there are formed guide holes 313 and 314 and a screw hole 315, such that a support 510 (see FIG. 13) of the electronic flash device is fixed thereinto for a photographing operation.

Figure 7:
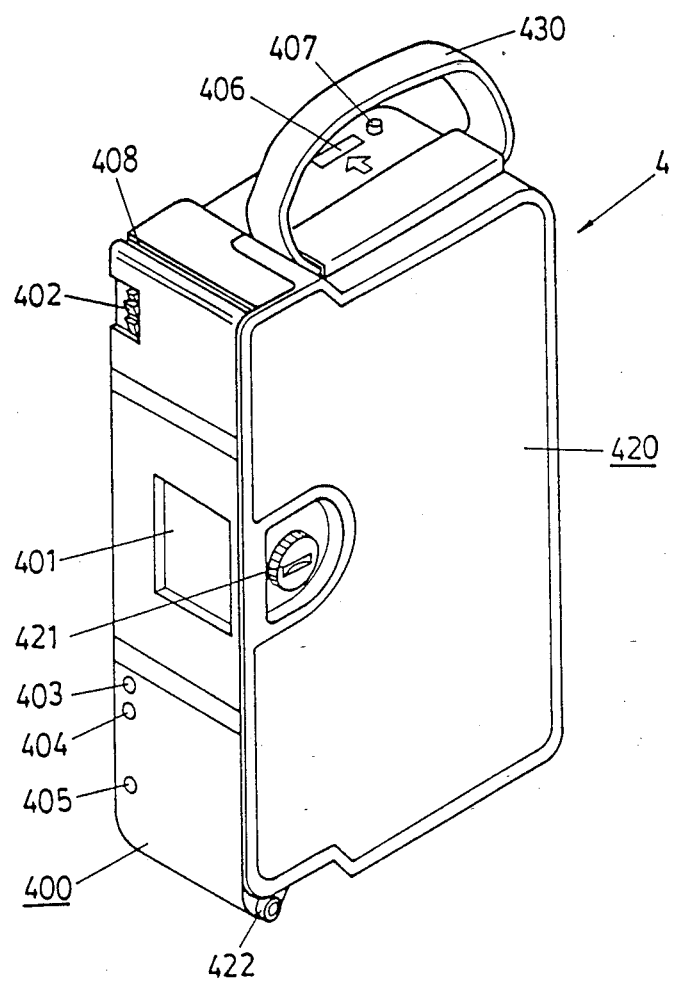
FIG. 7 is a perspective view showing an outer configuration of the film magazine.

Nextly, a construction of the film magazine 4 will be particularly described with reference to FIGS. 7 and 8.

This film magazine 4 includes a lid member 420 to be screwedly attached to a housing member 400 and a handle 430 fixedly attached to an upper portion of the lid member 420.

The housing member 400 includes an aperture 401 at a front face of which a film face is to be exposed, a driven gear 402 to come into mesh with a drive gear 450 to be described later and provided to the still camera 150 in FIG. 4, holes 403 and 404 for exchanging photo signals with the body 1 and a hole 405 for detecting an outer light.

To the lid member 420, there is attached a fixing screw 421 for fixing the lid member 420 to the housing member 400. At a lower end of the housing member 400, there is provided a guide roller 422 for guiding an insertion of the film magazine 4 into the still camera 150.

On the upper face of the housing member 400, there are provided a display section 406 constituted by a subtraction type electronic counter and adapted for displaying remaining film amount, a display button 407 for activating the display section 406 and a fixing groove 408 for fixing the film magazine 4 to the body.

Figure 8:
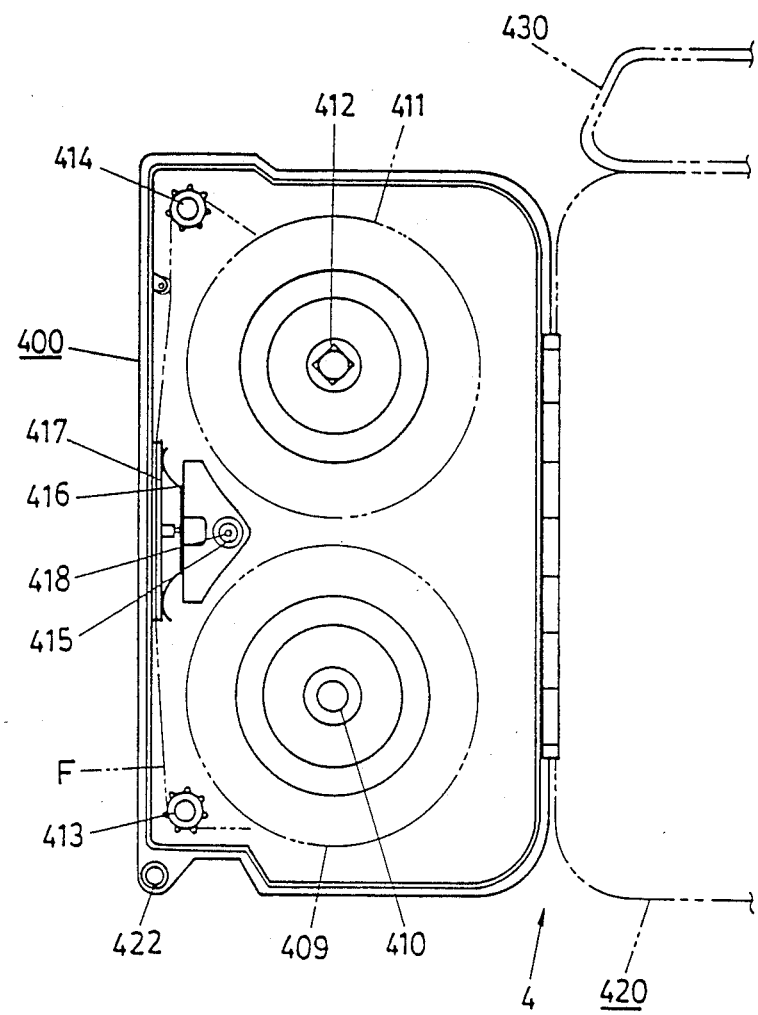
FIG. 8 is a front view showing the film magazine in FIG. 7 with its lid member being opened.

To the inner face of the housing member 400, as shown in FIG. 8, there are attached a feed reel 409 with a flange winding thereabout a long-length film F and a winding-up empty reel 411. To the inner face of the housing member 400, there are further provided a winding-up shaft 412 slidably operated via a friction member togetherwith the gear 402, a feed sprocket 413 rotatably attached to a passage of the film F, a winding-up sprocket 414 provided integrally with the gear 402, a screw hole 415 into which the fixing screw 421 of the lid member 420 engages and a pressing plate 417 for urging the film F by a spring 416 towards the aperture 401. The sprocket 413 fixedly carries a ring magnet 464 to be described later. Into the screw hole 415, there is inserted a pin 418 for operating a micro switch 463 for detecting an opened or closed condition of the lid member to be described later.

Nextly, a locking mechanism when the above-described film magazine 4 is inserted into the body 1 and a film winding-up mechanism will be particularly described with reference to FIG. 9 (a view taken from a direction IX of FIG. 10) and to FIG. 10 (a view taken from a direction X of FIG. 9).

The film magazine 4 is inserted through a film-magazine inserting hole 133 (see FIG. 3) defined in the upper face of the body 1 by rolling the guide roller 422 on a guide rail provided inside the magazine. By pressing forwardly the film magazine 4 at its inserted state, a convex rail 441a formed at an end portion of a back face of a hook 441 comes into locking engagement with the groove 408 defined in the upper face of the housing member 400, and, as will be more particularly described later, the film F is freely wound-up by a few frames and then an unexposed portion of the same appears at the aperture 401.

A middle portion of the hook 441 is pivotably attached via the shaft 442 to the base plate 440 and its convex rail 441a formed at the leading end of the back face of the hook 441 is brought by an urging force of a spring 443 into engagement with the groove 408 of the film magazine 4.

To an end of the hook 441 opposed to the film magazine 4, there is connected an actuator 444a for the solenoid 444. In operation, as will be more particularly described later, with each depressing operation of a hook release button 134, after the film F is freely wound-up by a few frames and an exposed film face is delivered into the film magazine, the solenoid is supplied with power. With this power supply, the actuator 444a contracts and releases the convex rail 441a of the hook 441 from its locked engagement with the groove 408, whereby the film magazine 4 becomes withdrawable from the apparatus body.

For withdrawing the film magazine 4 in the case e.g. of a power failure, a ball-point pen or the like is inserted into the forcible release hole 135 (FIG. 3) and the connecting portion between the hook 441 and the actuator 444a is depressed by a leading edge of the pen.

In this case, it is to be noted, since the free winding-up operation of the film F is not carried out, it is necessary to carry out the withdrawing operation of the film magazine 4 in a darkroom or a darkbag.

Further, the base plate 440 fixedly mounts a film winding-up motor 151 incorporating a group of speed reducing gears, with its speed reduction rotational shaft 151a integrally carrying a partially teethless gear 445.

This partially teethless gear 445 is in operative mesh via intermediate gears 446 and 447 and a bevel gears 448 and 449 with a drive gear 450. When the film magazine is mounted, the drive gear 450 comes into mesh with the driven gear 402 (shown in FIG. 7).

The intermediate gear 446 is loosely mounted on a shaft 447a of the intermediate gear 447 and is supported on a lever 452 clockwisely urged by a spring 451 and is regulated by a fixing raised portion 453 to be pivotable within a predetermined range. The intermediate gear 461 is meshable at a clockwise end thereof with the partially teethless gear 445. When the respective teeth edge portions are meshed with each other when the gears 445 and 446 starts their meshing engagement, the lever 452 pivots counterclockwise against the urging force of the spring 451 to release the intermediate gear 446 and returns to its original position when the partially teethless gear 445 has rotated to be meshable.

The partially teethless gear 445 integrally includes a cam 454. When this cam 454 switches OFF the normally closed micro switch 455, the power supply to the motor 151 is stopped thereby stopping the rotation of the partially teethless gear 445 to bring its teethless portion into opposition to the intermediate gear 446.

Figure 11:
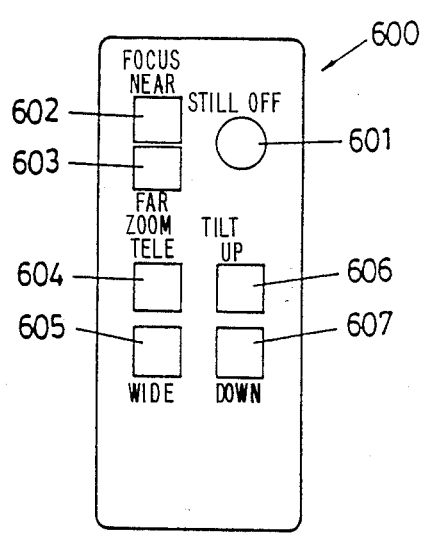
FIG. 11 is a plane view showing a first remote controlling unit.
Figure 12:
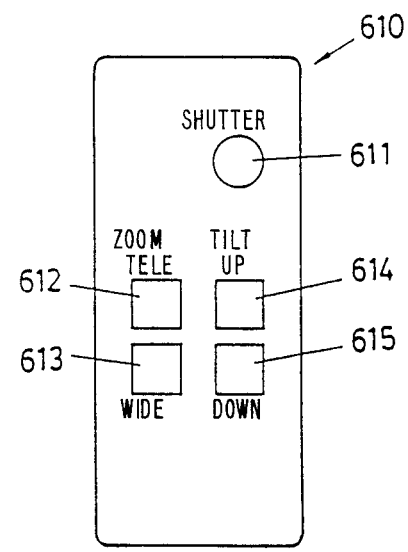
FIG. 12 is a plane view showing a second remote controlling unit.

Nextly, first and second remote controlling units 600 and 610 to be connected respectively to the remote connectors 123 and 124 provided at the rear face of the body 1 will be described with reference to FIGS. 11 and 12.

The first remote controlling unit 600 is adapted for an advisor operating the photographing apparatus; whereas, the second remote controlling unit 610 is adapted for a person to be photographed (the photographic object). The first remote controlling unit 600 includes a freeze release button 601 for releasing a frozen still image on the monitoring screen and returning the same to a motion image, focusing buttons 602 and 603 for switchably adjusting the focus to a short distance side or to a long distance side depending on the photographic object, zooming buttons 604 and 605 for adjusting a size of the monitored image by shifting the focal length of the photographic lens 101 to the TELE side or to the WIDE side and tilting buttons 606 and 607 for upwardly or downwardly moving the image position by tilting the base plate 210 of the base 2.

On the other hand, the second remote controlling unit 610 includes a shutter release button 611, zooming buttons 612 and 613 and tilting buttons 614 and 615 equivalent to those of the above first remote controlling unit 600.

Figure 13:
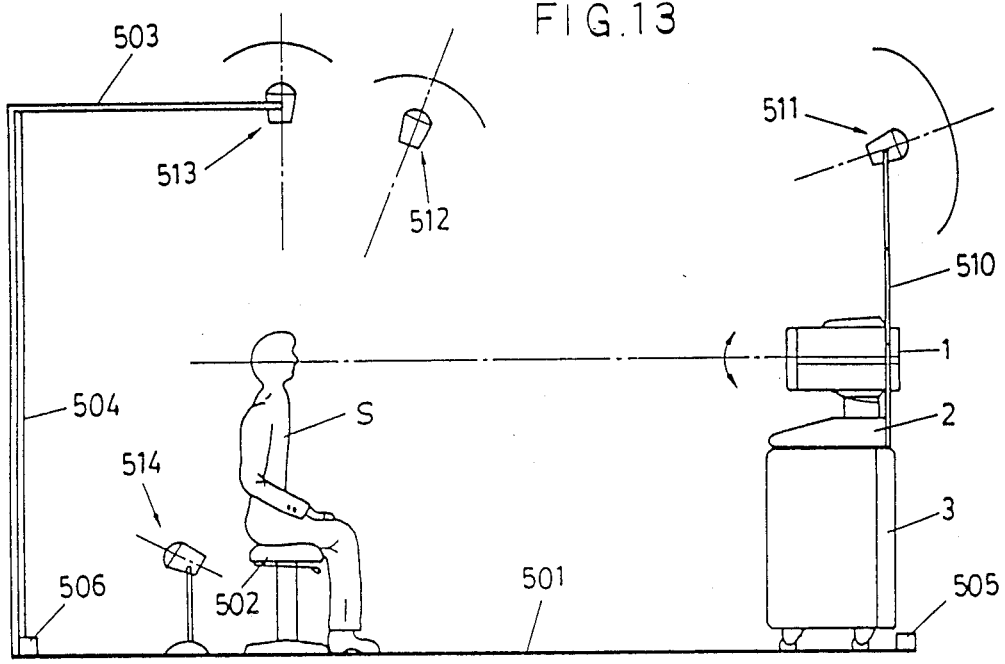
FIG. 13 is an explanatory view illustrating one example of a condition using the photographing apparatus with a self-monitoring television device shown in FIG. 1.

FIG. 13 shows a typical arrangement of this photographing apparatus with a self-monitoring device in use for a photographing operation.

For example, the carrying case 3 is placed at an end of a carpet 501 in a room, and the base 2 is mounted on the case 3. Then, the body 1 is attached to the base 2, and the lower end of the expandable and contractable support pole 510 is screwedly engaged with the lid member 311 of the case 3. Thereafter, a first electronic flash device 511 with a modeling light is attached to the upper end of the pole 510 to be variably directable thereabout.

At a certain position indicated by a mark or the like on the carpet 501, a chair 502 is placed and a frame 503 is placed rearwardly of the chair 502 with an appropriate distance therefrom and then a background paper 504 is stretchedly affixed to this frame 503.

Diagonally to the upper forward of and immediately above and also rearwardly of the chair 502, second, third and fourth auxiliary electronic flash devices 512, 513 and 514 are arranged respectively. The number and positional arrangement of these electronic flash devices may be conveniently varied depending on the size of the photographic object and also on the aim of the photographing.

The carpet 501 includes at forward and rearward portions thereof electrical outlets 505 and 506 connected via a wiring provided inside the carpet. The electronic flash devices are connected to these outlets 505 and 506. Accordingly, it is possible to prevent a plurality of electric wires from being inconveniently placed on the carpet. Further, such neat arrangement of wiring is also possible by employing an access floor (double-layered floor) instead of the ordinary floor.

When the advisor carries out a focus adjustment for a photographing operation, he may carry out the same by measuring by means e.g. of a tape measure a distance from the object S seated in the chair 502 or do the same by using the first remote controlling unit 600.

For the latter operation, after the power switch 118 provided at the back face of the body is turned ON with maintaining the body 1 horizontal, the manual button 127 is depressed to provide the manual mode.

Figure 14:
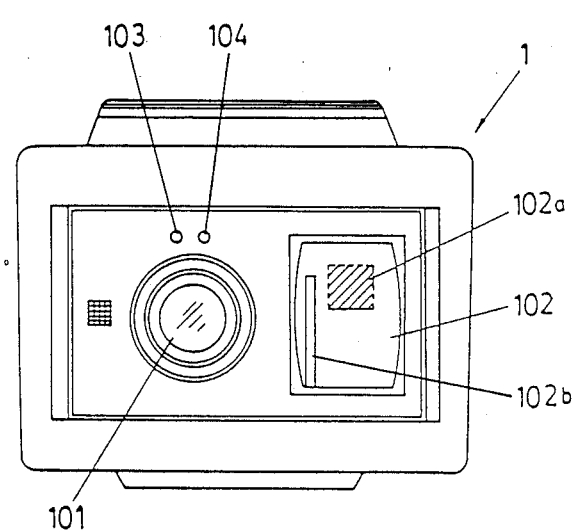
FIG. 14 is a front view of the body in a preliminary focus adjusting condition.

With the above switching operation to the manual mode, a square focus adjusting area 102a as illustrated in FIG. 14 appears centrally of the monitoring screen 102 and at the same time a white focusing bar 102b appears at the left of the monitoring screen.

Figure 15:
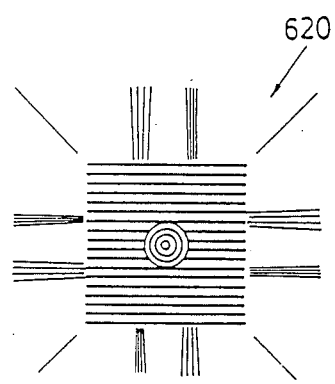
FIG. 15 is a pattern diagram illustrating focus adjusting patterns used in the preliminary focus adjusting condition.

In this condition, a focus adjusting pattern 620 as illustrated in FIG. 15 is set to the position of the photographic object S, the zooming button 604 is continuously depressed to maximize the focal length of the photographic lens 101 such that the pattern 620 completely covers the focus adjusting area 102a.

Thereafter, the apparatus is set to its closest focus position by the focusing button 602 and then gradually moved to a farther focus position by the focusing button 603, and then when the depression of the focusing button 603 is stopped at a position where the height of the focusing bar 102b is placed at its maximum, there is provided a focused condition of the CCD on the film face.

Then, the advisor depresses the zooming button 605 to set the focal length of the photographic lens 101 to an optimum value for the object S seated in the chair 502 and sets the aperture setting knob 128 of the body to a value suited for a film speed value of the employed film, whereby the preparatory operations for the photographing are completed.

When the object S is seated in the chair 502 with holding the second remote controlling unit 610 in his hand, his image same as that on the film face is formed in a laterally reversed condition on the monitoring screen 102.

Then, the advisor operates the tilting buttons 606 and 607 of the first remote controlling unit 600 depending on a seated height of the object S to adjust the tilting of the body 1 such that the image on the monitoring screen 102 may be placed at a predetermined position. Also, if necessary, the focusing buttons 602 and 603 are again operated to carry out a fine focus adjustment.

In this condition, if the object S sets his position, facial expressions or the like while monitoring his image on the monitoring screen 102 and then depresses the shutter release button 611 of the second remote controlling unit 610, the eye-guiding lamp 104 provided at the front face of the body 1 flickers for a short time period thereby guiding the object's eyes from the monitoring screen 102 towards the photographic lens 101, the video signal from the video camera 152 is frozen thereby stopping the monitored image and then the lens shutter is activated with flashings of the electronic flash devices 511 through 514 during its opening, whereby the photographic operation is completed.

Since the monitored image immediately before the photographing operation remains on the screen after the photographing operation, if the user approaches the monitoring screen and examines his self image thereon at the moment of the shutter release and finds it unsatisfactory as he had his eyes closed or had tensed facial expressions, he can take another photography on the spot.

After the completion of the photographing operation, the advisor depresses the freeze release button 601 of the first remote controlling unit 600 thereby returning the monitored image from the still condition to a motion condition, and then when the charging completion lamp 103 of the body is illuminated, the apparatus is ready for the next photographing operation.

Figure 16:
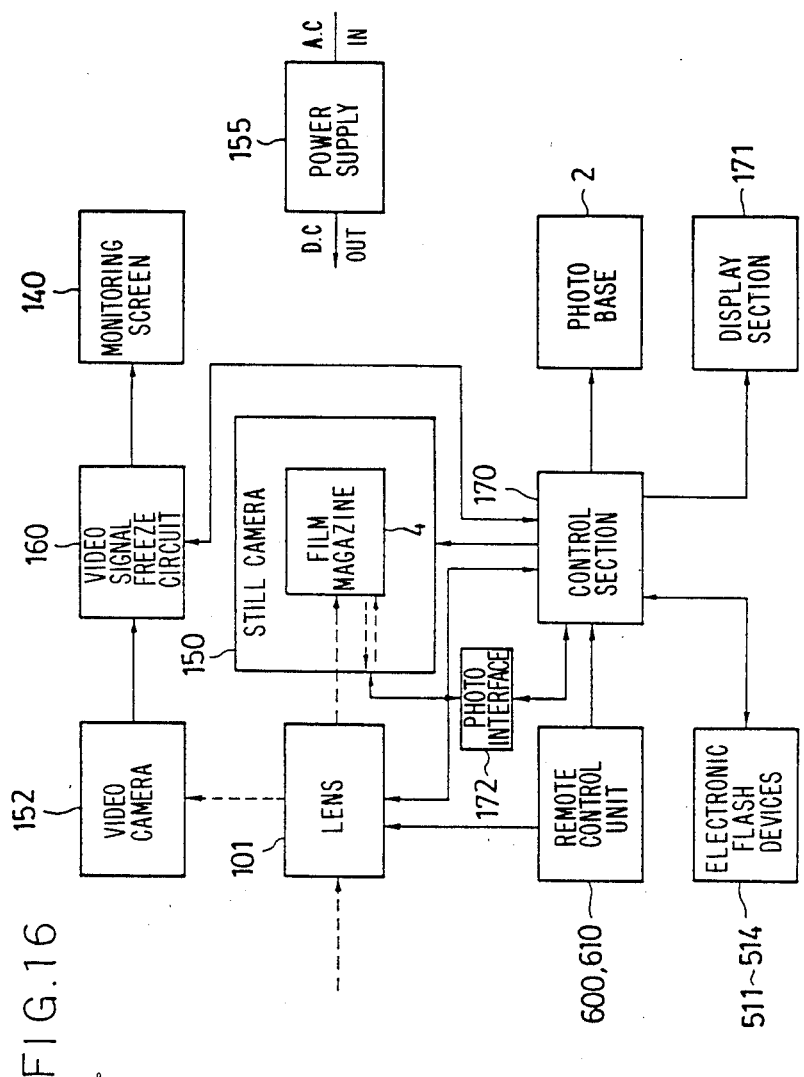
FIG. 16 is a block diagram showing a schematic construction of this embodiment.

FIG. 16 is a block construction diagram showing a schematic construction of the photographing apparatus with a self-monitoring device according to this embodiment. In this figure, the members and components corresponding to those described above are denoted by the same reference numerals and marks. Also in this figure, it is to be noted, solid line arrows denote flowing directions of the electricity; whereas, broken line arrows denotes travelling directions of the light.

A video signal freeze circuit 160 shown for the first time in this FIG. 16 is adapted for freezing (fixing) the video signals immediately before the object image is photographed on the film inside the film magazine 4 mounted to the still camera 150 and then for forming the still image on the monitoring screen 140. This video signal freeze circuit 160 will be more particularly described later. A control section 170 generically represents all the control sections for the respective components in the body 1 and for the tilting mechanism for the base 2. A display section 171 generically represents the counters, warning lamps, display lamps and the like.

A photo-interface 172 constitutes an input-output section for a light-emitting diode (LED) and a photo transistor for effecting optical communications between the body 1 and the film magazine 4.

Functions of the above respective components will be described with reference to FIGS. 17a, 17b and 17c which are block circuit diagrams.

Firstly, inside the body 1, in addition to the aforementioned video signal freeze circuit 160, there are provided a shutter-operation effectiveness judging circuit 173, a flicker-timer circuit 174, a shutter solenoid driving circuit 176 for driving a shutter solenoid 177, a winding-up motor driving circuit 178 for driving the winding-up motor 151, a dummy-feed control circuit 179, a dummy-feed counter 180, a magazine lock release solenoid driving circuit 181, a magazine count pulse generating circuit 182, an effective photography count judging circuit 183, a magazine condition judging circuit (receiving) 184, an aperture control circuit 185, a data imprinting circuit 186 for illuminating a data imprinting lamp 187 and so on.

Referring to other reference numerals in the same figure, a numeral 190 denotes a micro switch for detecting an attachment of the film magazine 4, a numeral 191 denotes a photo switch for detecting a shutter opening, a numeral 192 denotes a photo switch for detecting a closure of the shutter, a numeral 193 denotes a transmitter LED for a photointerface, a numeral 194 denotes a receiver photo transistor and a numeral 195 denotes a back-up power source for the photo counter 116.

The photographic lens 101 carries a focusing ring 11, a zooming lens 12 and an aperture ring 13, which are respectively rotated by the motors 14, 15 and 16 to effect focus adjustment, zooming and aperture adjustment operations. The motor 14 for the focus adjustment has its start and rotational direction controlled by a switch opened and closed by the focusing buttons 602 and 603 of the first remote controlling unit 600. The motor 15 for the zooming has its start and rotational direction controlled by the zooming buttons 604, 605 and 612 and 613 respectively of the first and second remote controlling units 600 and 610.

The motor 16 for the aperture adjustment is driven by the aperture control circuit 185 in accordance with a switched position of a changeover switch 128s switched over by the aperture setting knob 128 in FIG. 3 whereby the motor 16 controls a rotational position of the aperture ring 13, i.e. the aperture diameter.

Further, between the photographic lens 101 and the aperture, there is provided a half-mirror 17, and also rearwardly of the aperture there is provided a lens shutter 18 (to be briefly referred to as a shutter hereinafter). The light from the photographic object, as illustrated by its optical axis indicated by an alternate long and short dash line, is divided into two light components by the half-mirror 17 with the straight travelling light component passing the aperture to be formed as an image on the film F inside the film magazine 4 and the other light component deflected by an angle of 90 degrees by the half-mirror 17 being formed as an image through the group of reducing lenses 19 onto the photographic face of the CCD 20 inside the video camera 152.

Therefore, the video camera 152 converts by its CCD 20 the image of the same range as the image formed on the film F into video signals and then laterally reverses the same through the video signal freeze circuit 160 and forms this as an image on the CRT screen of the color monitoring television device 140.

Accordingly, the user (photographic object) may set his pose as he pleases while monitoring his laterally reversed image on the screen as if he were monitoring his image in a mirror.

A typical construction of the video signal freeze circuit 160 is shown in FIG. 18. Referring to the same figure, the video signals from the video camera 152 are digitized by an A/D converter 161 and are written through a memory write circuit 162 into a frame memory 163 having a capacity for storing one film frame length of image information (2 fields). This memory write circuit 162 is energized while a normally set FF circuit 164 generates an output Q of '1' thereby rewriting the contents of the frame memory 163. On the other hand, when the output Q is switched to '0', the writing operation is temporarily stopped during this condition and the previous contents of the frame memory 163 are frozen (fixed).

On the other hand, the contents of the frame memory 163 are always read out by a memory read circuit 165 and are re-converted into analog video signals through a D/A converter 166 to be transmitted to the monitoring television device 140 to be formed as an image thereon.

A clock generating circuit 167 generates clock signals for operating in constant synchronization with each other the A/D converter 161, the memory write circuit 162, the frame memory 163, the memory read circuit 165 and the D/A converter 166.

Thereby, the image from the video camera 152 is normally monitored in real time on the monitoring television device 140. On the other hand, when a timed-up signal from the flicker timer circuit 174 in FIG. 17(a) is input to a reset terminal R of the FF circuit 164 in the course of a photographing operation, the output Q is switched to '0' thereby stopping the writing operation of the memory write circuit 162, and therefore, there is continuously provided on the monitoring television device 140 the image frozen immediately before the input of the timed-up signal.

Figure 17A:
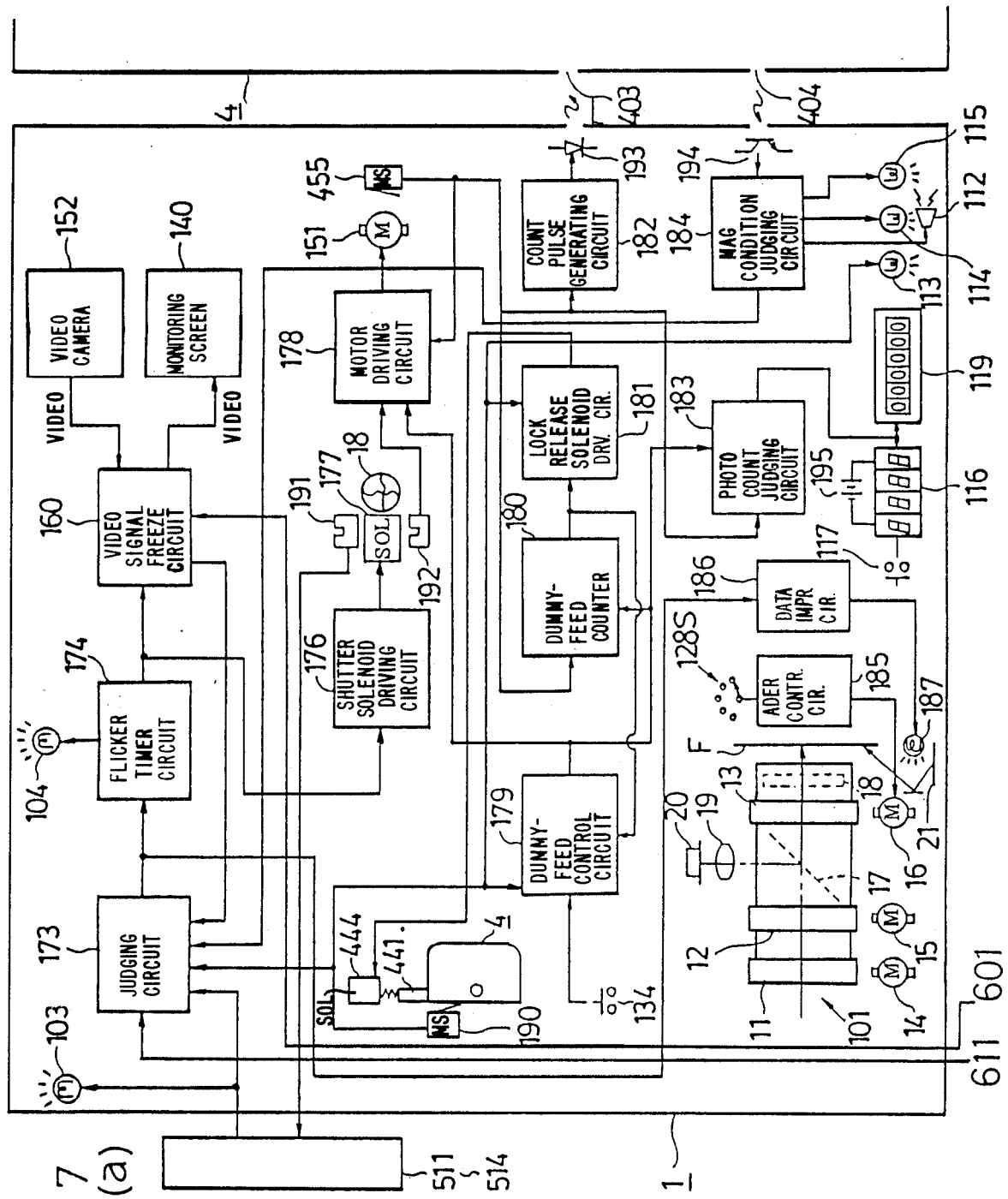
FIGS. 17(a), 17(b) and 17(c) are block circuit diagrams showing in details the block construction of FIG. 16.
Figure 17B:
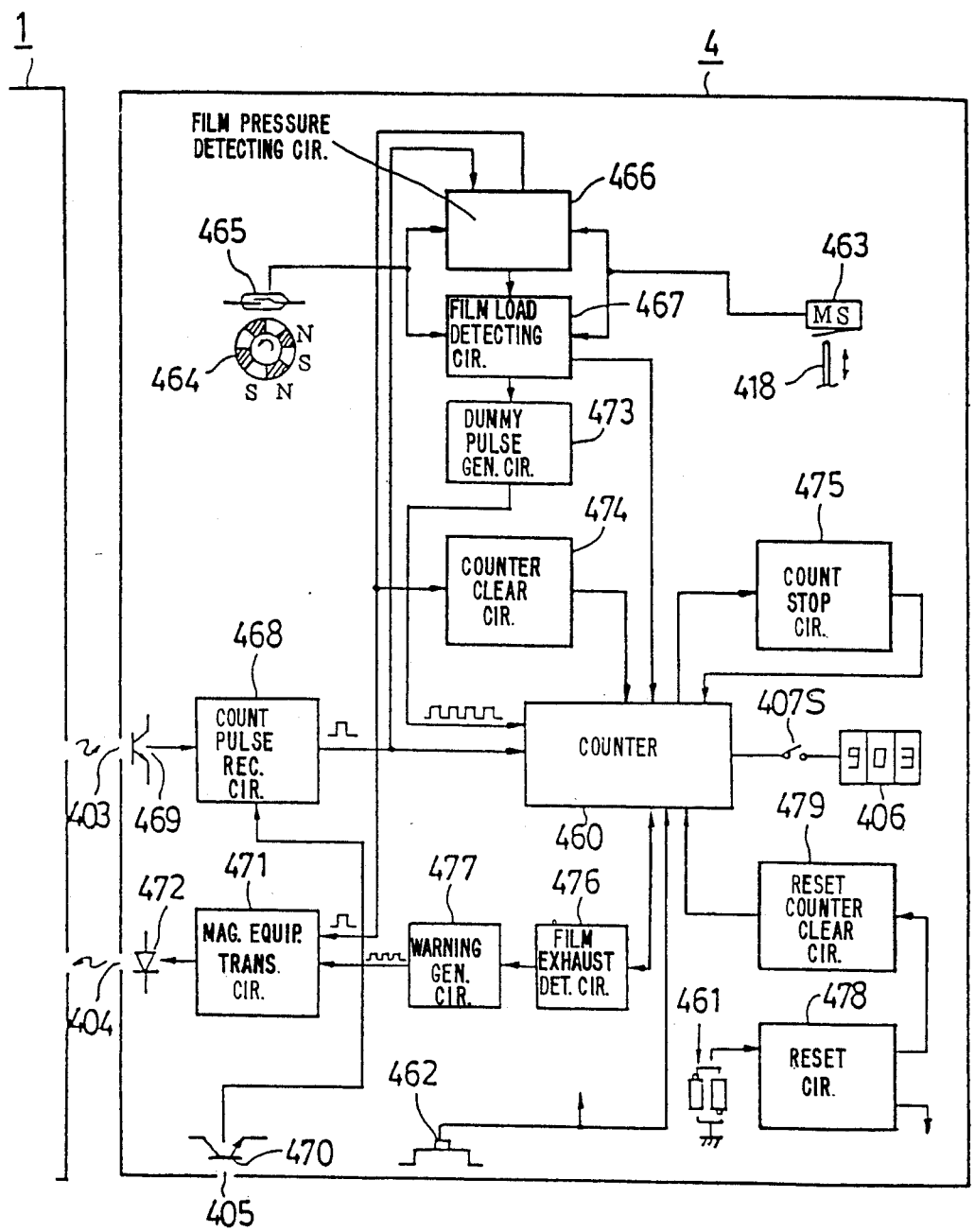
Figure 17C:
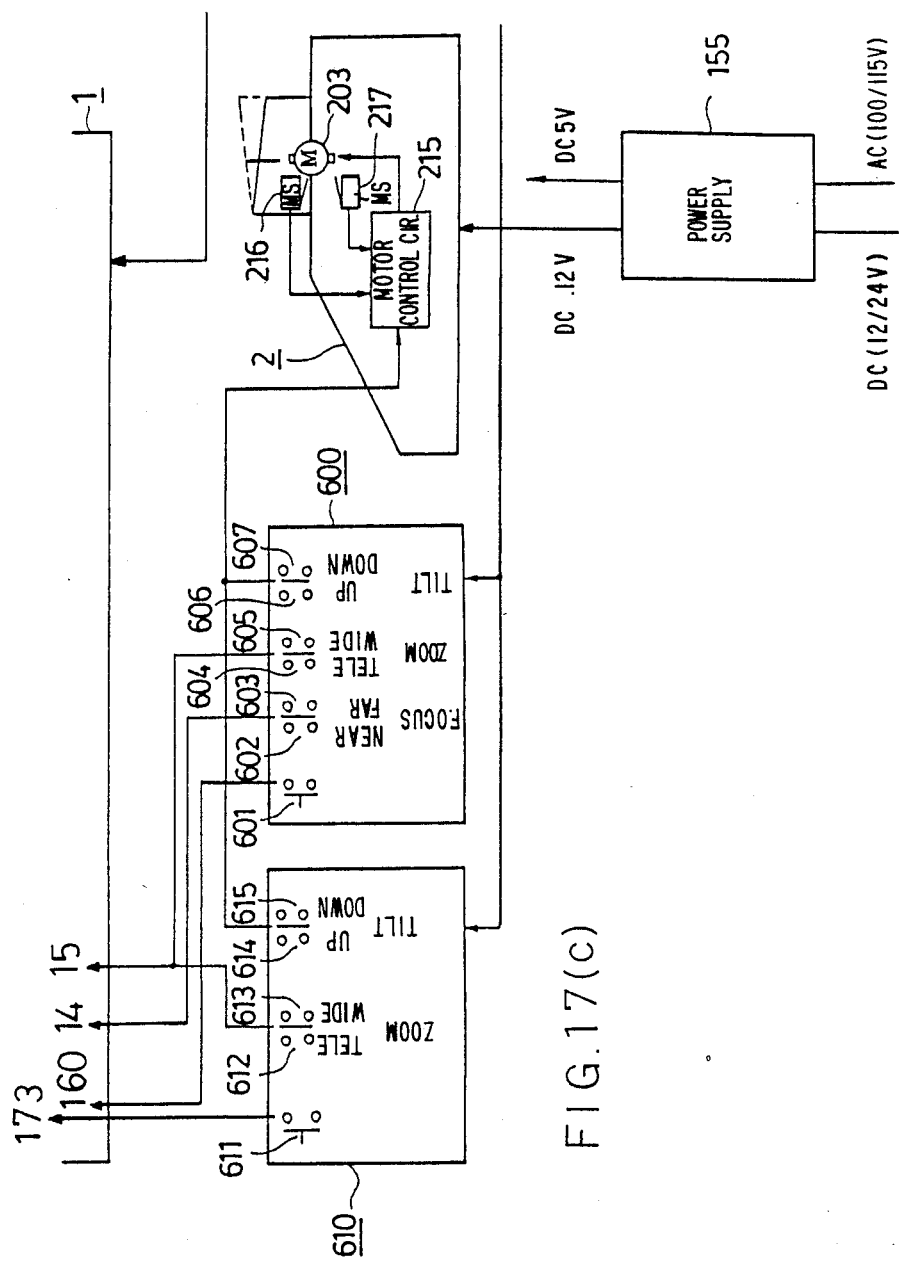
Figure 19:
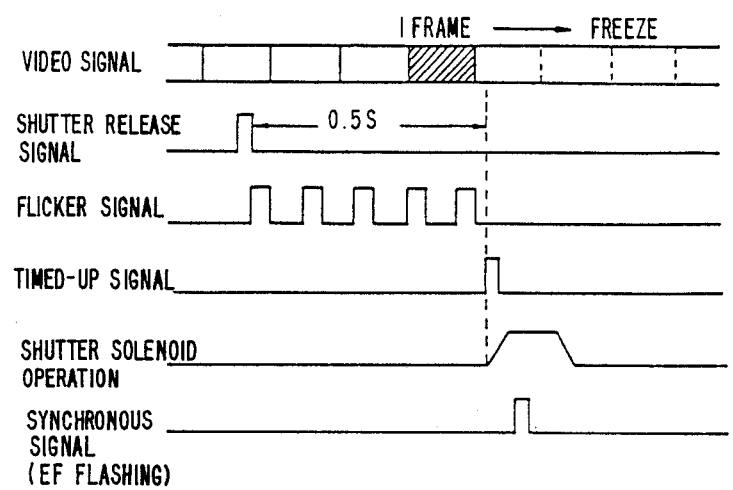
FIG. 19 is a timing chart illustrating chronological relationship among the respective signals in this embodiment.
Figure 20:
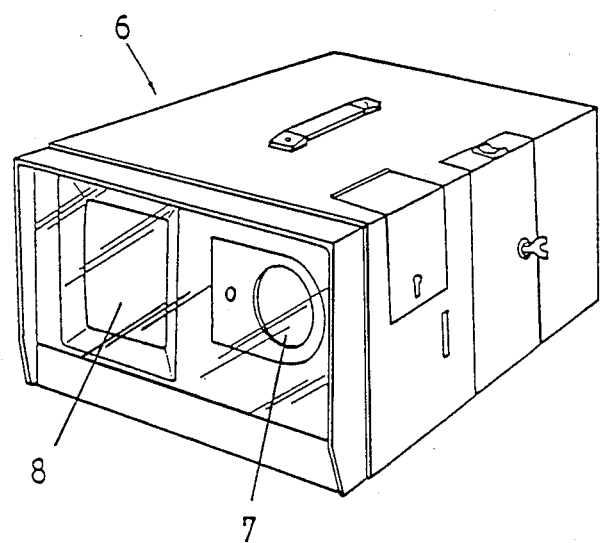
FIG. 20 is a perspective view illustrating an outer configuration of a prior-art photographing apparatus with a self-monitoring device.

In the above condition, the output Q is also input to the shutter operation effectiveness judging circuit 173 shown in FIG. 17(a), which invalidates successive shutter freeze signals whereby a photographic operation may not be carried out with a depression of the shutter release button 611, thus a double exposure may be advantageously prevented.

Thereafter, if the freeze release button 601 of the first remote controlling section 600 is depressed, its signal '1' is input to the reset terminal R of the FF circuit 164 thereby switching the output Q back to '1'. Accordingly, the memory write circuit 162 resumes the writing operation and a real time image is again monitored on the monitoring television device 140, whereby the apparatus is ready for the next photographing operation.

Referring back to FIGS. 17(a), 17(b) and 17(c), with completion of charging, the electronic flash devices 511 through 514 generate charging completion signals to the shutter operation effectiveness judging circuit 173 of the body 1 and at the same time illuminates the charging completion lamp 103.

The shutter operation effectiveness judging circuit 173 comprises a gate circuit for judging whether or not to validate the shutter release signal received with the depression of the shutter release button 611 of the second remote controlling section 610. This circuit 173 validates and generates the release signal only when all of the signals from the micro switch 190 for judging the attachment of the film magazine (switched ON with the attachment of the film magazine 4), the judging signal from the magazine condition judging circuit 184 ('1' in the presence of the film, '0' in the absence of the film), the signal from the video signal freeze circuit 160 (normally in the state of '1', '0' in the image frozen state) in addition to the above charging completion signals are in the 'ON' state or '1'.

When this effective freeze signal is input to the flicker timer circuit 174, the timer and the flicker are energized thereby flickering the eye-guiding lamp (LED) 104 for the predetermined time period, and then the timer generates a timed-up signal to the video-freeze circuit 160 and generates the same to the shutter solenoid driving circuit 176.

By receiving this timed-up signal, the video signal freeze circuit 160 freezes video signals corresponding to one frame film immediately before the signal input and forms a still image based on the video signals on the monitoring television device 140.

On the other hand, the shutter solenoid driving circuit 176 is energized immediately thereafter to drive the shutter solenoid 177. Thereby, the shutter 18 is opened, and as detecting this shutter opening, the photo switch 191 outputs synchronous signals to the electronic flash devices (EF) 511 through 514 whereby the still camera carries out a photographing operation on the film F.

Then, when the shutter 18 is closed, as the photo switch 192 detects this shutter closure and generates a signal to the winding-up motor driving circuit 178 to drive the winding-up motor 151 to wind up the film F inside the film magazine 4 by one frame length and the micro switch 455 (see FIG. 10) is switched ON at the initial position of the motor 151.

With this signal, the magazine count pulse generating circuit 182 generates a count pulse and flickers the LED 193 and transmits the signal to the film magazine 4.

Simultaneously therewith, the effective photography count judging circuit 183 generates a pulse in the case of an effective photogaphy and increments the photo counter 116 (electronic counter) and the sum total counter 119 (unresettable mechanical counter).

With the above, one photographing operation is completed. Chronological relationships among the respective signals in the course of the above operations are illustrated in a timing chart in FIG. 19.

In the above operations, it is to be noted, when the shutter operation effectiveness judging circuit 173 generates an effective shutter release signal, the data imprinting circuit 186 is energized to illuminate the data imprinting lamp (LED) 187 thereby illuminating the information card 21 (the information about the person to be photographed is recorded in the form of a bar code) inserted into the information card insertion hole 136 and imprinting the information at a side portion outside the picture frame of the film F.

Also, an LED not shown is illuminated for a number of times corresponding to the number of photographing operations for the same object thereby imprinting this information also on the film F.

Nextly, operations carried out when the hook release button 134 for withdrawing the film maganize 4 will be particularly described.

When this hook release button 134 is depressed, a signal from the switch switched ON by the depression is input to the dummy feed control circuit 179. In this condition, if the micro switch 190 is in the state of OFF (absence of the film magazine 4), this control circuit 179 does not generate any signal. On the other hand, if the micro switch 190 is in the state of ON (presence of the film magazine 4), the control circuit 179 generates a signal, and with a rise in this signal the dummy feed counter 180 is reset and at the same time the winding-up motor driving circuit 178 is activated to wind up the film F inside the film magazine 4 and the effective photography count judging circuit 183 is blocked, whereby the counters 116 and 119 may not be counted up with an input of the signal from the micro switch 455.

The micro switch 455 is switched ON each time the film F is wound up by one frame length by the rotation of the motor 151 and its output signal is counted by the dummy feed counter 180. Then, when its count value has become a predetermined value, e.g. '3', the dummy feed counter 180 generates a count-up signal.

When this count-up signal is input to the dummy feed control circuit 179, this circuit 179 stopps generating any signal thereby de-energizing the winding-up motor driving circuit 178.

Figure 9:
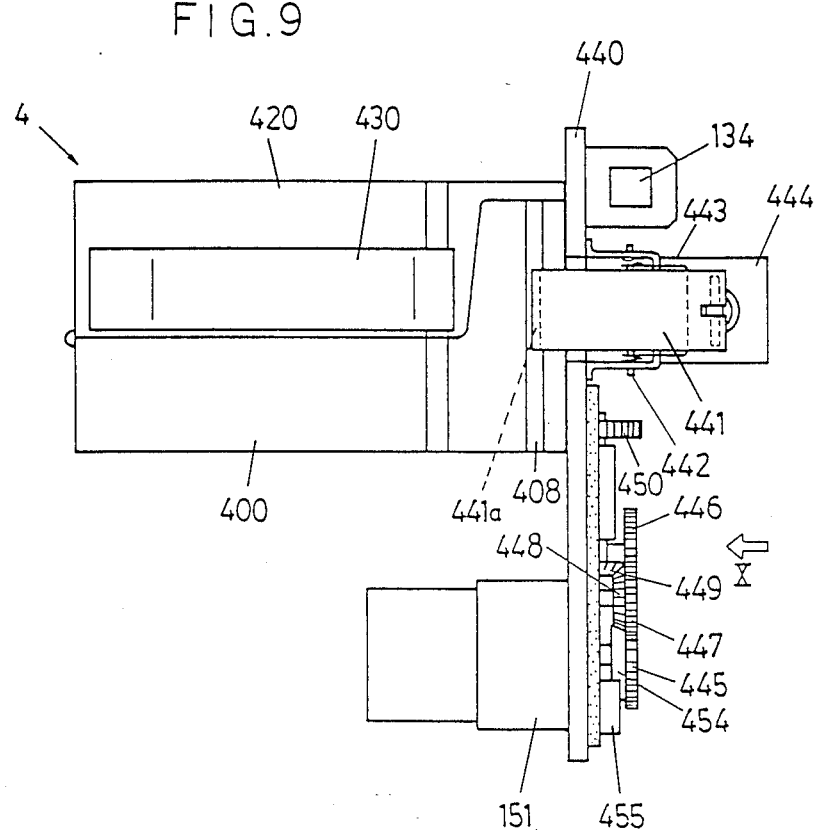
FIG. 9 is a side view taken along a direction IX in FIG. 10 showing the film magazine being attached to the apparatus body.
Figure 10:
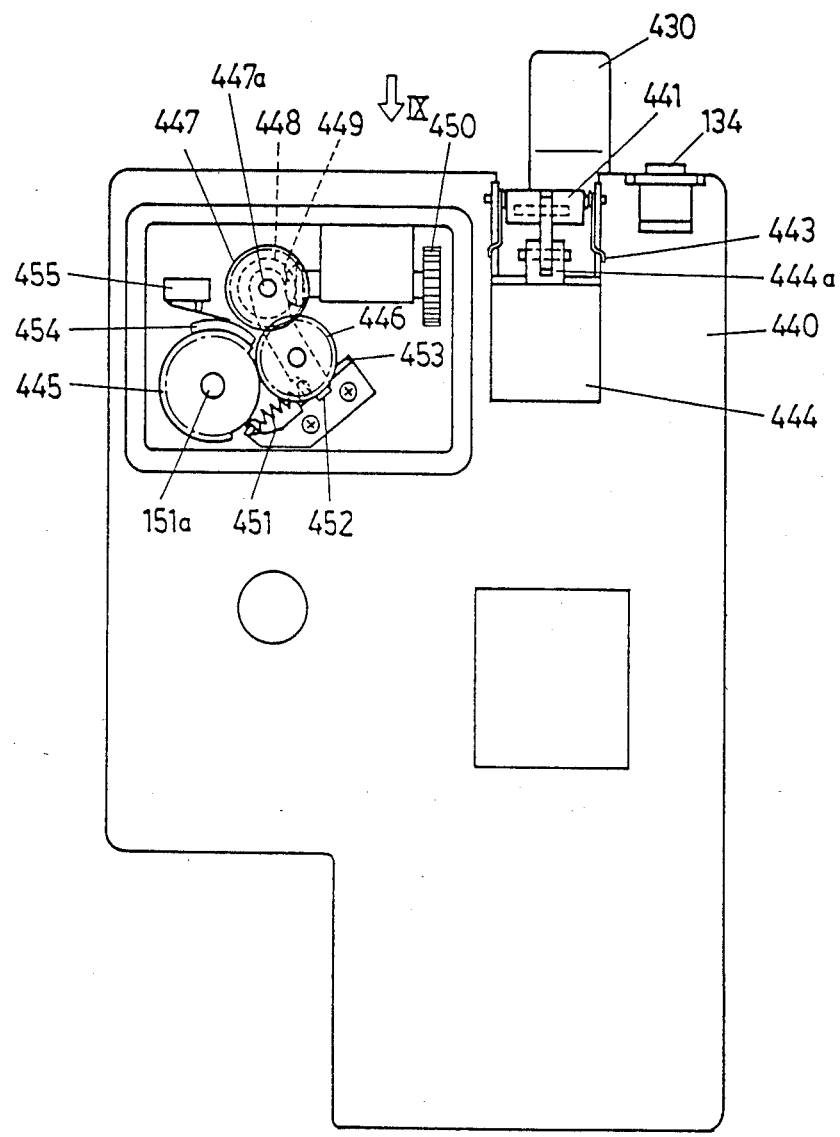
FIG. 10 is a front view taken along a line X in FIG. 9.

At the same time, this count-up signal energizes the magazine lock release solenoid driving circuit 181 thereby driving the magazine lock releaser solenoid 444, whereby the hook 441 shown in FIGS. 9 and 10 is pivoted to release the locking engagement of the film magazine 4.

Thereafter, when the film magazine 4 is withdrawn, the micro switch 190 is switched OFF thereby de-energizing the magazine lock release solenoid driving circuit 181 to de-energize the solenoid 444. Accordingly, the hook 441 returns to its locked position by the urging force of the spring. Also, when the mirco switch 190 is in the state of OFF, the the warning lamp 113 is illuminated for warning the absence of the film magazine 4.

As described above, when the film magazine 4 is to be withdrawn, even if the hook release button 134 is depressed, the magazine 4 may be withdrawn only after the film F has been automatically wound up by three frame length. Therefore, there is no possibility that the magazine is withdrawn with a used (exposed) film frame being exposed at the aperture portion. This feature is very convenient when a user wants to develop only the exposed film portion in the middle of series of film exposures by withdrawing the film magazine 4 from the apparatus.

Also, in the case of the presence of the film magazine 4 as well, just as in the previous case, as the micro switch 190 is switched over from OFF to ON, the dummy feed control circuit 179 is energized with the above rise in the pulse whereby the film is automatically wound up by three frame length and a film portion which has been not possibly exposed is fixedly placed at the aperture portion. In this case however, since the magazine lock release solenoid driving circuit 181 is inhibited from its operation by the rise in the signal of the micro switch 190. Therefore, the circuit 181 remains de-energized against the input of the count-up signal from the dummy feed counter 180.

Also, in the above film winding-up operations (free winding-up) as well, with the ON signal from the micro switch 455, the magazine count pulse generating circuit 182 generates a count pulse signal to illuminate the LED 193 and transmits its signal to the film magazine 4.

Nextly, circuitry inside the film magazine 4 will be particularly described.

Inside the film magazine 4, there are provided the subtraction electronic counter 460 (will be briefly referred to as a subtraction counter hereinafter) and other circuits associated therewith. All of the counter 460 and the circuits are supplied with power from an incorporated battery 461.

The subtraction counter 460 is reset to a predetermined initial value, e.g. '903' when a new film is loaded or the manual reset button 462 is depressed. When the display button 407 shown in FIG. 7 is depressed, the count value on this counter 460 is displayed on the display section 406 constituted by a three-decimal-place LED.

A reference numeral 463 denotes the micro switch energized by the pin 418 shown in FIG. 8 and adapted for detecting the opening or closed condition of the lid member 420. This micro switch 463 is switched ON when the lid member 420 is closed and then is fixed at this position by tightening the fixing screw 421 shown in FIG. 7 and the switch 463 is switched OFF when the lid member 420 is opened.

The reference numeral 464 denotes the ring magnet fixed to the same shaft or a shaft operatively connected thereto. This ring magnet 464 has its outer periphery alternately magnetized with the N polarity and the S polarity, and with a rotation of this ring magnet 464 a lead switch 465 disposed adjacent thereto is alternately switched ON and OFF.

The signals of the micro switch 463 and the ON or OFF signal of the lead switch 465 are input to a film presence detecting circuit 466 and also to the film loading detecting circuit 467.

On the other hand, the count pulse receiving circuit 468, when the photo transistor 469 receives the light from the LED 193 of the body 1 through the hole 403, generetes a count pulse thereby decrementing the subtration counter 460 unless the photo transistor 470 does not detect any outside light through the hole 405 at the time of input of its detection signal.

The film presence detecting circuit 466 determines an absence of the film and generates a single pulse since the sprocket 413 is not rotated in spite of the film winding-up operation when the count pulse is input to the circuit 466 from the count pulse receiving circuit 468 while the micro switch 463 is in the state of ON and the lead switch 465 remains in the state of ON or OFF (the ring magnet 464 is not rotated).

When the magazine condition generating circuit 471 receives this pulse, the same illuminates the LED 472 for a one short time period thereby communicating the absence of the film to the body 1.

When this absence is detected by the magazine condition judging circuit 184 of the body 1, the warning lamp 115 for warning absence of the film is illuminated and at the same time the warning buzzer 112 is activated for a relatively long time period to provide a warning sound (beeping sound) and also an ineffective signal is tranmitted to the shutter operation effectiveness judging circuit 173.

If the micro switch 463 is in the state of OFF and the lead switch 465 is repeatedly switched ON and OFF, judging that a film loading operation is now under way, the film loading detecting circuit 467 generates a film loading completion signal when the micro switch 463 is switched to ON thereafter (when the lid member 420 is closed).

When the dummy pulse generating circuit 473 receives this signal, the same generates a dummy pulse for a predetermined times (4 pulses in this case) and causes the subtraction counter 460 to subtract its contents by the number of the pulses. This subtracting operation is carried out for subtracting the number of film frames used for the film loading operation from the number of the remaining film frames.

Also, on receiving the film-absence detection signal (single pulse) from the film presence detecting circuit 466, the film loading detecting circuit 467 stores this input, and then when the same receives the ON and OFF signals from the lead switch 465 with a switching-OFF of the micro switch 463, the film loading detecting circuit 467 judges that a new film has been loaded into the film magazine 4 and thus resets the contents of the subtraction counter 460 to its initial value ('903' in this case).

Thereafter, when the lid member 420 of the film magazine 4 is closed and the micro switch 463 is switched ON, in the same manner as the previous case, the film loading completion signal is output and the value '4' is subtracted from the initial contents of the counter 460 (the contents become '899' in this case).

A counter clear circuit 474 generates a clear pulse thereby clearing the contents of the subtraction counter 460 to the value '000' when the same receives the film-absence signal pulse from the film presence detecting circuit 466.

A count stop circuit 475 is activated when the count value on the subtraction counter 460 has become a predetermined smaller value, e.g. '7' thereby stopping the counting operation of the subtraction counter 460. Therefore, even if there still exist unused frames in the film, the contents of the subtraction counter 460 do not become '000' while a photographing operation is possible.

Further, when the value on the subtraction counter 460 has become a certain value, e.g. '103', this is detected by a film exhaustion detecting circuit 476 and a film exhaustion warning signal generating circuit 477 genetates a film exhaustion warning signal in the form of e.g. three successive pulses.

When the magazine condition transmitting circuit 471 receives this signal, the circuit 471 flickers the LED 472 for three times thereby communicating the same to the body 1.

On the other hand, based on this information, the magazine condition judging circuit 184 of the body 1 judges that the film is nearly used up and illuminates the a film use-up warning lamp 114 and at the same time activates the buzzer 112 to provide a sound warning of a relatively short cycle (pip, pip) for a predetermined time period (e.g. for two seconds).

When the battery 461 is exchanged with a new one, an initial reset circuit 478 is activated to initialize the respective components and a battery reset counter clear circuit 479 clears the displayed contents of the substraction counter 460 to the value '000'.

As described above, according to this film magazine 4, there is provided the subtraction counter 460 for subtracting its contents by the count pulse from the body 1 associated with a film winding-up operation and the count value is corrected based on the detection signals from the film presence judging circuit 466 and the film loading detecting circuit 467. As the result, the user may always be informed of an accurate number of remaining film frames.

Also, the absence and presence and also nearly used-up condition of the film inside the film magazine 4 are communicated to the body 1 and the same may be informed to the user by the illumination of the warning lamps and the sounding of the warning buzzers.

Lastly, the base 2 includes the motor control circuit 215 for controlling the motor 203 shown in FIG. 5 and the micro switches 216 and 217 for detecting the upper and lower limits of the driven screw 208.

And, by operating the first and second remote controlling units 600 and 610, the motor control circuit 215 controls the start and rotational direction of the motor 203 to vertically move the driven screw 208 within the range which upper and lower limits are regulated by the micro switches 216 and 217 thereby varying the tilting angle of the body 1.

What is claimed is:

1. A photographing apparatus with a self-monitoring device comprising:
   a still camera and a video camera sharing a photographic lens with each other;
   a monitoring television device for forming a monitored image thereon from video signals obtained by said video camera;
   a film magazine accommodating a film;
   a housing member for accommodating therein said still camera, video camera, monitoring television device and said film magazine;
   means for freezing the video signals from said monitoring television device in connection with a shutter release operation; and
   optical communicating means for communicating information concerning a film winding-up operation, the remaining film amount and the like between said film magazine and the body of said photographing apparatus.

2. A photographing apparatus as defined in claim 1, wherein:
said film accommodated in said film magazine is a long-length film and said film magazine is detachably attached to a body of said photographing apparatus.

3. A photographing apparatus as defined in claim 2, wherein said film magazine includes a subtraction type electronic counter for indicating a remaining amount of the film.

4. A photographing apparatus as defined in claim 3, wherein said film magazine further includes locking means for locking said film magazine at a locked condition thereof, lock release means for releasing said locked condition and automatic free winding means for automatically carrying out a free winding-up operation of the long-length film by a predetermined frame length before said lock release means releases the locking by said locking means.

5. A photographing apparatus as defined in claim 4, wherein said locking means comprises a combination of a hook provided to the apparatus body and a groove provided to said film magazine coming into engagement with each other.

6. A photographing apparatus as defined in claim 4, wherein said lock release means electrically releases said hook of the apparatus body from said groove of the film magazine.

7. A photographing apparatus as defined in claim 6, wherein said lock release means releases said hook of the apparatus body from said groove of the film magazine by energizing a solenoid to cause an actuator to contract.

8. A photographing apparatus as defined in claim 4, wherein said lock release means permits a manual forcible release.

9. A photographing apparatus as defined in claim 2, wherein said film magazine further includes locking means for locking said film magazine at a locked condition thereof, lock release means for releasing said locked condition and automatic free winding means for automatically carrying out a free winding-up operation of the long-length film by a predetermined frame length before said lock release means releases the locking by said locking means.

10. A photographing apparatus as defined in claim 9, wherein said locking means comprises a combination of a hook provided to the apparatus body and a groove provided to said film magazine coming into engagement with each other.

11. A photographing apparatus as defined in claim 9, wherein said lock release means electrically releases said hook of the apparatus body from said groove of the film magazine.

12. A photographing apparatus as defined in claim 11, wherein said lock release means releases said hook of the apparatus body from said groove of the film magazine by energizing a solenoid to cause an actuator to contract.

13. A photographing apparatus as defined in claim 9, wherein said lock release means permits a manual forcible release.

* * * * *